United States Patent [19]

Höfer

[11] 4,253,439
[45] Mar. 3, 1981

[54] FUEL INJECTION PUMP

[75] Inventor: Gerald Höfer, Flacht, Fed. Rep. of Germany

[73] Assignee: Robert Bosch GmbH, Stuttgart, Fed. Rep. of Germany

[21] Appl. No.: 15,993

[22] Filed: Feb. 28, 1979

[30] Foreign Application Priority Data

Mar. 25, 1978 [DE] Fed. Rep. of Germany ....... 2813111

[51] Int. Cl.³ .......................... F02D 1/04; F02D 1/06
[52] U.S. Cl. .................................................. 123/368
[58] Field of Search ................. 123/139 AD, 139 BD, 123/140 FP, 140 FG, 140 R, 139 AB, 139 AF; 417/294

[56] References Cited

U.S. PATENT DOCUMENTS

| 3,027,843 | 4/1962 | Raibaud | 123/140 FP |
| 3,219,020 | 11/1965 | Roosa | 417/294 |
| 3,635,603 | 1/1972 | Eheim | 417/294 |
| 3,942,498 | 3/1976 | Eheim | 123/140 R |
| 3,945,360 | 3/1976 | Laufer | 123/139 BD |
| 3,946,713 | 3/1976 | Laufer | 123/139 BD |
| 4,038,956 | 8/1977 | Perr | 123/139 AF |

FOREIGN PATENT DOCUMENTS 2311935 12/1976 France .................. 123/139 AF

Primary Examiner—Charles J. Myhre
Attorney, Agent, or Firm—Edwin E. Greigg

[57] ABSTRACT

A fuel injection pump having a governor in which the downward regulation sleeve is also displaced toward a smaller injection quantity if the flyweight adjustment fails when the injection quantity selection lever is at the idling position.

5 Claims, 2 Drawing Figures

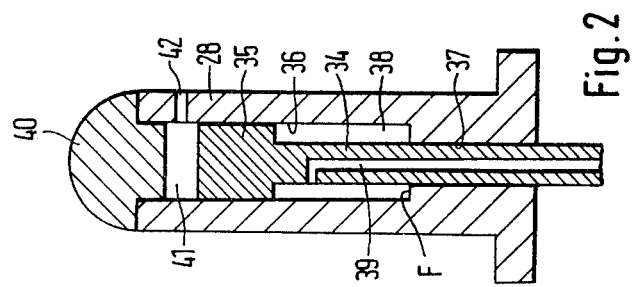
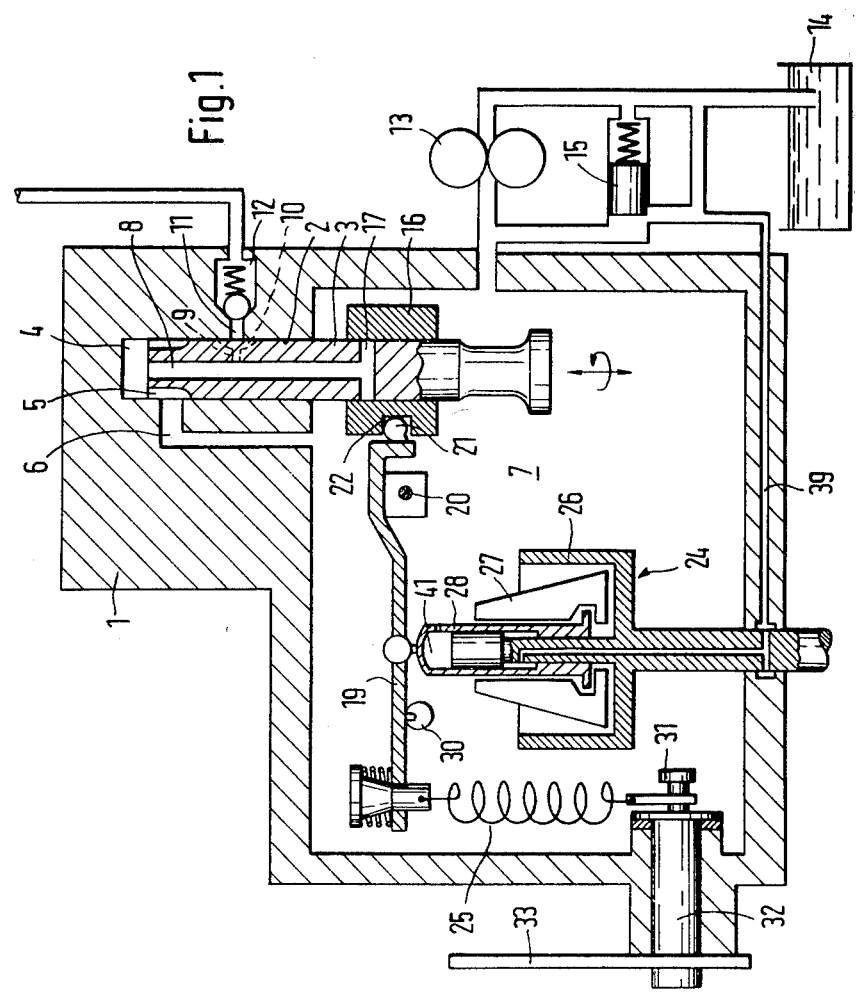

FUEL INJECTION PUMP

BACKGROUND OF THE INVENTION

The invention relates to a fuel injection pump. In known fuel injection pumps of the type herein, for each set position of the quantity control member associated with one quantity, there is a balance in the regulation between the regulator spring force on the one hand and the centrifugal forces contacting the governor sleeve on the other. Then, as soon as the rpm increase as a result of a change in loading of the vehicle, for example, from uphill driving to downhill driving, then the higher rpm, through the centrifugal adjuster, causes a displacement of the governor sleeve and thus a displacement of the quantity control member in the direction of a smaller injection quantity. When there is an undesired increase in rpm, normally the adjustment lever is displaced by the driver in the direction of a smaller injection quantity, that is, toward a lower engine speed. The actual displacement into the position for the vehicle, then takes place through the centrifugal governor, that is, the governor sleeve. If for any reason at all, however, the centrifugal adjustment fails, for example, as a result of sticking of the flyweights, there is the danger that the engine may "race" or overspeed, since, while the regulator spring is relaxed, the actual setting force for a smaller injection quantity is still lacking.

OBJECT AND SUMMARY OF THE INVENTION

The fuel injection pump, constructed in accordance with the invention, has the advantage over the prior art in that even when the mechanical centrifugal adjuster fails, that is, for example, when the flyweights stick, a downward regulation of the injection quantity corresponding to the adjustment lever occurs. The hydraulic force required for adjustment is relatively small and normally augments the centrifugal force. This supplemental force may be compensated for by means of a somewhat increased initial stressing of the regulator spring.

The invention will be better understood as well as further objects and advantages thereof become more apparent from the ensuing detailed description of a preferred embodiment taken in conjunction with the drawing.

BRIEF DESCRIPTION OF THE DRAWING

FIG. 1 is a longitudinal sectional view of a fuel injection pump constructed in accordance with the invention, and FIG. 2 is an enlarged sectional view of the governor sleeve and governor tang of the pump of FIG. 1.

DESCRIPTION OF THE PREFERRED EMBODIMENT

A housing 1 of a fuel injection pump is provided with a cylindrical bore 2 in which a pump piston 3 is received. The pump piston 3 executes a simultaneous rotating and reciprocating motion in response to the action of drive means (not shown). The working chamber 4 of the pump is provided with fuel from a suction chamber 7 by longitudinal grooves 5 formed in the outer surface of the pump piston 3 and by a bore 6 within the housing 1. Fuel delivery takes place while the pump piston 3 executes its suction stroke or while it is moving toward its bottom dead center position. As soon as the bores 6 have been closed after an appropriate rotation of the pump piston 3, the fuel located in the pump working chamber 4 is delivered via a longitudinal channel 8 extending within the pump piston 3, a radial bore 9, and a longitudinal distributing groove 10 formed in the outer wall of the pump piston 3 to one of a plurality of pressure lines 11. The number of pressure lines 11 is equal to the number of engine cylinders to be supplied with fuel and these lines are distributed about the circumference, discharging into the cylindrical bore 2. Each of the pressure lines 11 leads to a check valve 12 and to injection valves (not shown) associated with the individual cylinders of the internal comubstion engine.

The suction chamber 7 is supplied with fuel by a fuel pump 13 which takes fuel from a fuel storage container 14. The pressure in the suction chamber 7 is controlled in a known manner in accordance with rpm by a pressure control valve 15 so that the pressure in the suction chamber increases with increasing rpm.

Slidably located on the pump piston 3 is an annular slide member 16 which during the course of the pressure stroke controls the aperture of a radial bore 17 communicating with the longitudinal channel 8 and thus determines the delivery quantity. After the aperture of the radial bore 17 has been opened, fuel flows back into the suction chamber 7.

The annular slide member 16 acting as the quantity control member is displaced by a tension lever 19, which is pivotably about a shaft 20. The lever 19 is provided with a spherical head 21 on one end which engages a recess 22 in the annular slide member 16. The other end of the tension lever 19 engages a centrifugal force adjuster 24, which is an rpm signal transducer, the force adjuster 24 acting against the force of a regulator spring 25, also engaging the tension lever 19.

The centrifugal force adjuster or governor 24 includes a carrier 26 holding flyweights 27, which together with the carrier 26 are driven through a drive means (not shown) at a constant ratio with respect to the rpm of the pump piston 3. As a result of centrifugal force, the flyweights 27 are displaced outward and, in turn, displace a governor sleeve 28 seated on the shaft of the governor, which sleeve 28 engages the tension lever 19 at a point thereon with an rpm-dependent force.

The farther downward the annular slide member 16 is displaced as a result of the pivotal movement of the tension lever 19, the smaller the fuel quantity delivered by the injection pump, since the radial bore 17 is opened during the delivery stroke of the pump piston at a correspondingly earlier instant and a greater proportion of the fuel quantity delivered by the pump piston flows back into the suction chabmer.

The maximum delivery quantity is determined by the uppermost position of the annular slide member 16, which position is limited by an eccentrically adjustable stop 30 of the tension lever 19. The degree of downward displacement of the annular slide member 16 at a certain rpm is dependent on the force exerted by the regulator spring 25 on the tension lever 19. This force is determined in turn by an eccentric 31 which is disposed on a shaft 32 rotatable by means of an adjustment lever 33, the lever 33 being arbitrarily actuatable by the driver of the vehicle with which the internal combustion engine is incorporated. The regulator spring 25 is suspended at its end and remote from the tension lever 19 on the eccentric 31.

As may be seen particularly in FIG. 2, the governor sleeve 28 is disposed for axial displacement on a tang 34.

The displacement of the governor sleeve 28 is accomplished in the manner described above by means of the flyweights 27 against the force of the regulator spring 25. The tang 34 has a head or section 35 of enlarged diameter at its upper end which is disposed within section 36 of enlarged diameter within the bore 37 of the regulator sleeve 28.

Just as the tang 34 slides in substantially snug-fitting relationship within the bore 37, so the enlarged section 35 slides in substantially snug-fitting relationship within the enlarged bore 36. Between the tang 34 and the governor sleeve 28, an annular chamber 38 is defined, which is pressure-relieved by a channel 39 extending towards the suction side of the delivery pump 13. The first section of channel 39 extends within tang 34, so that it can be guided further within the housing 1 to the suction side of the delivery pump 13. If desired, the channel 39 may also be directly pressure-relieved toward the fuel container 14.

The chamber 41 enclosed between the section 35 and the upper section 40 of the regulator sleeve communicates through a bore 42 with the suction chamber 7. Thus, as described above, the governor sleeve would be expected to be pressure-balanced hydraulically. However, because there is the pressure-relieved annular chamber 38, the force exerted upwardly on the governor sleeve 28 is greater.

The force resulting therefrom and exerted on the governor sleeve 28 in the direction of the centrifugal forces must be large enough that even when the centrifugal forces fail, for example, if the flyweights stick the force causes the annular slide member 16 to be displaced toward a smaller delivery quantity, and adjustment lever 33 is to that extent also displaced into a position for a small delivery quantity. By this means, "racing" of the internal combustion engine is prevented.

Naturally, the invention is not limited to the type of distributor injection pump shown, but rather may be incorporated in every conceivable type of injection pump. Thus, the hydraulic force, for example, instead of arising through the pressure relief of an annular chamber, may be created in that, if, for example, no delivery pump pressure prevails in the surroundings of the centrifugal governor, such a pressure is conveyed into the chamber 41 formed between the governor sleeve 28 and the tang 34, and the chamber must then be embodied in an enclosed form.

The foregoing relates to a preferred embodiment of the invention, it being understood that other embodiments and variants thereof are possible within the spirit and scope of the invention, the latter being defined by the appended claims.

What is claimed and desired to be secured by Letters Patent of the United States is:

1. A fuel injection pump for internal combustion engines having a fuel delivery pump generating an rpm-dependent pressure and having an rpm governor, said governor including a tension lever for actuating a quantity control member which is engaged in the direction of decreasing injection quantity by a governor sleeve provided with a longitudinal bore by means of which it is slidable in sealingly manner on a tang and enclosing in said bore a damping chamber connected via a bore to surrounding rpm-dependent pressure, said rmp-dependent pressure creating a damping force acting on the governor sleeve, the governor sleeve being displaceable by means of flyweights as well as by a regulator spring whose force is variable through an adjustment lever characterized by the provision of at least one area of the governor sleeve exposed to a second force other than the damping chamber force, whereby the damping chamber force applies a resulting force on the governor sleeve in the direction of decreasing fuel quantity, which force displaces the governor sleeve toward downward fuel regulation irrespective of the action of the flyweights at the idling position of the adjustment lever but at a higher rpm than the idling rpm.

2. A fuel injection pump in accordance with claim 1, including said tang on which said governor sleeve is disposed in snug-fitting radial relationship for axial displacement, said governor sleeve defining with said tang a chamber which is under delivery pump pressure.

3. A fuel injection pump in accordance with claim 2, wherein said governor sleeve is provided with a bore and is surrounded by fuel under delivery pump pressure within a volume, said governor sleeve bore leading from said chamber defined by said sleeve and said tang to said suction chamber, said tang having a head for the purpose of attaining a supplemental force acting in the centrifugal force direction, said governor sleeve having an interior bore provided with a section of enlarged diameter for slidably accommodating said tang head, said tang head and said section of enlarged diameter defining an annular chamber, and a channel for pressure-relieving said annular chamber towards said sleeve surrounding volume in a sealed manner.

4. A fuel injection pump in accordance with claim 3, wherein said channel extends with said tang in the form of a bore having sections.

5. A fuel injection pump in accordance with claim 4, wherein said channel communicates with the suction side of the delivery pump.

* * * * *